(12) United States Patent
Furuta

(10) Patent No.: US 8,730,433 B2
(45) Date of Patent: May 20, 2014

(54) COUPLING STRUCTURE FOR WIRE GRID TYPE INORGANIC POLARIZER AND VIDEO PROJECTOR INCLUDING THE SAME

(75) Inventor: Yoshihiro Furuta, Neyagawa (JP)

(73) Assignee: SANYO Electric Co., Ltd., Moriguchi-Shi (JP)

( * ) Notice: Subject to any disclaimer, the term of this patent is extended or adjusted under 35 U.S.C. 154(b) by 213 days.

(21) Appl. No.: 13/210,141

(22) Filed: Aug. 15, 2011

(65) Prior Publication Data

US 2012/0050627 A1    Mar. 1, 2012

(30) Foreign Application Priority Data

Aug. 25, 2010 (JP) ................................. 2010-188349

(51) Int. Cl.
*G02F 1/1335* (2006.01)
(52) U.S. Cl.
USPC ........................................ 349/96; 34/5; 34/8
(58) Field of Classification Search
None
See application file for complete search history.

(56) References Cited

U.S. PATENT DOCUMENTS

| | | | |
|---|---|---|---|
| 6,169,594 B1 | 1/2001 | Aye et al. | |
| 2003/0117708 A1 | 6/2003 | Kane | |
| 2004/0008416 A1 | 1/2004 | Okuno | |
| 2005/0213043 A1 | 9/2005 | Nakashima et al. | |
| 2006/0098283 A1* | 5/2006 | Sato | 359/486 |
| 2006/0238715 A1 | 10/2006 | Hirata et al. | |
| 2008/0266662 A1 | 10/2008 | Perkins | |

FOREIGN PATENT DOCUMENTS

| | | | |
|---|---|---|---|
| JP | 2004-245871 A | 9/2004 | |
| JP | 2008-102183 A | 5/2008 | |

OTHER PUBLICATIONS

State Intellectual Property Office of People's Republic of China First Office Action dated Aug. 20, 2013; Application No. 201110215000.X; Applicant: Sanyo Electric Co., Ltd.
State Intellectual Property Office of People's Republic of China Search Report; Applicant No. 201110215000.X; Applicant: Sanyo Electric Co., Ltd.

* cited by examiner

*Primary Examiner* — Wen-Ying P Chen
(74) *Attorney, Agent, or Firm* — NDQ&M Watchstone LLP

(57) ABSTRACT

A coupling structure for a wire grid type inorganic polarization plate. The coupling structure includes a holder and a wire grid type inorganic polarization plate. The holder includes a flat portion and an open portion through which light passes. The inorganic polarization plate includes a glass substrate, a wire grid formed by metal elements on the glass substrate, and a surface protection substrate that covers the wire grid. The inorganic polarization plate is coupled to the holder with the flat portion of the holder held between the glass substrate and the surface protection substrate, and the wire grid inserted into the open portion of the holder.

18 Claims, 3 Drawing Sheets

COUPLING STRUCTURE FOR WIRE GRID TYPE INORGANIC POLARIZER AND VIDEO PROJECTOR INCLUDING THE SAME

CROSS-REFERENCE TO RELATED APPLICATIONS

This application is based upon and claims the benefit of priority from prior Japanese Patent Application No. 2010-188349, filed on Aug. 25, 2010, the entire contents of which are incorporated herein by reference.

BACKGROUND OF THE INVENTION

The present invention relates to a structure for coupling a wire grid type inorganic polarizer and a video projector including such a structure.

Recent video projectors project images with higher contrast. This has resulted in the need for improvement in image quality. To meet such a requirement, inorganic orientation panels are used as liquid crystal panels in a video projector. Further, instead of the conventional organic polarizers, which are arranged in front and behind a liquid crystal panel, wire grid type inorganic polarizers are now being used.

A typical type of polarizer is an absorptive type polarizer, which is formed from a polymer film containing iodine or a dye. The absorptive type organic polarizer has high polarization capability but absorbs light in a specific direction if it is not linear polarized light. Thus, the resistance to light (light resistance) is low with regard to light having short wavelengths such as ultraviolet light. Further, when light having a large light flux density strikes an organic polarizer, problems related to heat resistance may arise. For example, heat may accumulate and deform the polarizer. The dye may lose the color when heated. Accordingly, heat lowers the polarization capability.

An inorganic polarizer has high light resistance and thus has come into use in lieu of an organic polarizer. A representative example of an inorganic polarizer is a wire grid type inorganic polarizer. A wire grid type inorganic polarizer includes a wire grid formed by arranging elongated metal elements on a transparent glass substrate in intervals shorter than the wavelength of light. Refer to, for example, Japanese Laid-Open Patent Publication Nos. 2008-102183 and 2004-245871. A wire grid of metal elements has low mechanical strength. When wiped by a cloth, the wire grid may be damaged thereby adversely affecting the polarization function. To solve this problem, a surface protective coating may be applied to the metal elements. However, the surface protective coating would adversely affect the optical characteristics. For example, the light transmittance and absorptance may be decreased and the light reflectance may be increased. Further, the surface protective coating cannot protect the metal elements from an impact applied from the outer side by an object. Thus, in such a case, the metal elements may be damaged. To solve this problem, for example, the structure shown in FIG. 5 may be employed when using the conventional wire grid type inorganic polarizer.

In this structure, a polarization plate is coupled to a holder 101, which is used to facilitate coupling to a product and to adjust the coupling angle when coupled to the product. In the prior art example of FIG. 5, the holder 101 includes an opening 101a, which is used to couple the polarization plate. A wire grid type inorganic polarization plate 102 is inserted into the opening 101a. The wire grid type inorganic polarization plate 102 is set so that its glass substrate 102a is arranged at an outer side and its metal elements 102b are arranged at an inner side. A spacer 103 is arranged along the periphery of the glass substrate 102a. A surface protection glass plate 104 is fixed to the spacer 103 to seal the opening 101a opposite to the glass substrate 102a. The spacer 103 is discrete from the holder 101.

In this structure, the metal elements 102b are sealed between the glass substrate 102a and the surface protection glass plate 104. Thus, dust is prevented from collecting on the metal elements 102b. This eliminates the need to wipe the surface of the metal elements 102b. Further, impacts are prevented from being applied from the outer side by an object.

However, the structure of FIG. 5 uses a relatively large number of components. Further, additional work is necessary since the wire grid type inorganic polarization plate 102 and surface protection glass plate 104 are required to be inserted into the opening 101a of the holder 101 with the spacer 103 arranged in between. Thus, there is a demand for a simplified structure. Further, the polarization capability of a wire grid type inorganic polarizer is generally lower than that of a typical organic polarizer. Nevertheless, the wire grid type inorganic polarizer requires high precision machining and is expensive.

SUMMARY OF THE INVENTION

It is an object of the present invention to provide a simple structure for coupling a wire grid type inorganic polarizer and to provide a video projector that efficiently uses a wire grid type inorganic polarizer.

One aspect of the present invention is a coupling structure for a wire grid type inorganic polarization plate. The coupling structure is provided with a holder and a wire grip type inorganic polarization plate. The holder includes a flat portion and an open portion through which light passes. The wire grid type inorganic polarization plate includes a glass substrate, a wire grid formed by a plurality of metal elements on the glass substrate, and a surface protection substrate that covers the wire grid. The inorganic polarization plate is coupled to the holder with the flat portion of the holder held between the glass substrate and the surface protection substrate, and the wire grid inserted into the open portion of the holder.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE INVENTION

Figure 1:
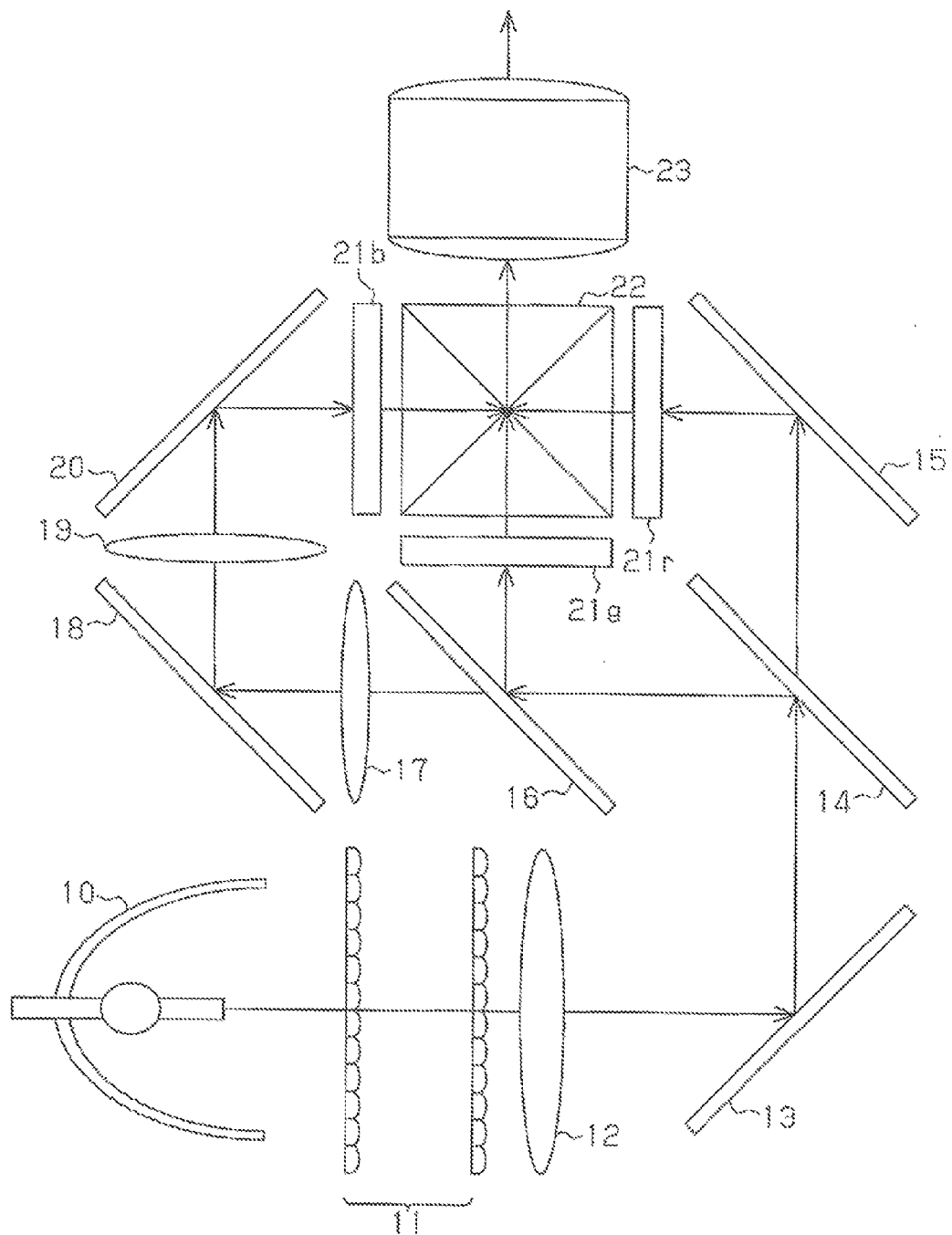
FIG. 1 is a schematic diagram of an optical system of a liquid crystal projector.

A video projector according to one embodiment of the present invention will not be described. The video projector of the present embodiment is a three-LCD projector. The optical system of the video projector will now be described with reference to FIG. 1.

The optical system includes a light source lamp 10, which is formed by a metal halide lamp or the like. White light emitted from the light source lamp 10 travels through an integrator lens 11 and a condenser lens 12. Then, a full reflection mirror 13 deflects the light by 90° toward a first dichroic mirror 14, which forms a light separation optical system. The integrator lens 11 is formed by two lenses, with each lens designed to entirely irradiate a liquid crystal panel 33, which will be described later. The integrator lens 11 functions to average luminance variations that occur in parts of the light emitted from the light source lamp 10. This reduces the difference in light intensity between a central portion and peripheral portion of an image.

The first dichroic mirror 14 transmits light in the red wavelength band and reflects light in the cyan (greenish blue) wavelength band. The light in the red wavelength band transmitted through the first dichroic mirror 14 is reflected by a full reflection mirror 15 toward a liquid crystal light valve 21r for red light. The liquid crystal light valve 21r performs optical modulation on the red light based on an image signal.

The light in the cyan wavelength band reflected by the first dichroic mirror 14 is guided to a second dichroic mirror 16. The second dichroic mirror 16 transmits light in the blue wavelength band and reflects light in the green wavelength band. The reflected light of the green wavelength band is guided to a liquid crystal light valve 21g for green light, which performs optical modulation on the light based on an image signal.

The light in the blue wavelength band transmitted through the second dichroic mirror 16 is guided via relay lenses 17 and 19 and full reflection mirrors 18 and 20 to a liquid crystal light valve 21b, which performs optical modulation on the light based on an image signal. In the present embodiment, the light separation optical system is formed by the first and second dichroic mirrors 14 and 16, the full reflection mirrors 15, 18, and 20, and the relay lenses 17 and 19.

A dichroic prism 22 combines or synthesizes the light rays (single-color image light) modulated by the liquid crystal light valves 21r, 21g, and 21b to generate combined colored image light A projection lens 23 enlarges and projects the combined colored image light onto a screen (not shown).

The structures of the liquid crystal light valves 21r, 21g, and 21b will now be described with reference to FIG. 2. The liquid crystal light valves 21r, 21g, and 21b basically all have the same structure.

Each of the liquid crystal light valves 21r, 21g, and 21b includes a reception side polarizer 31, an optical compensator 32, a liquid crystal panel 33, and an emission side polarizer 34.

The reception side polarizer 31 includes an inorganic polarization plate and an organic polarization plate. Non-polarized incident light strikes the reception side polarizer 31. From the non-polarized incident light, linear polarized light oscillated in a direction that coincides with a light transmission axis of the reception side polarizer 31 is transmitted, and linear polarized light oscillated in other directions is reflected or absorbed. The structure of the reception side polarizer 31 will be described later in detail.

The optical compensator 32 compensates for birefringence of the liquid crystal panel 33. Further, the optical compensator 32 is used to raise the contrast of the video projector and eliminate variations in black displays.

The liquid crystal panel 33 is of a transmission type. Further, the liquid crystal panel 33 is operated in modes including a TN mode and a VA mode. In accordance with a control signal from a control unit (not shown), the liquid crystal panel 33 performs optical modulation on red light, green light, or blue light and emits the modulated light.

The emission side polarizer 34 is formed by adhering a sapphire substrate 34a and an organic polarization plate 34b. To realize the optical modulation function of the liquid crystal panel 33, the emission side polarizer 34 is arranged at an angle that results in its light transmission axis being orthogonal or parallel to the light transmission axis of the reception side polarizer 31. The operation mode of the liquid crystal panel 33 determines whether the angle obtains an orthogonal arrangement or parallel arrangement. When the polarizers 31 and 34 are arranged in a state in which the actual angle differs from the desired angle, the display capability may become insufficient. Accordingly, a pivoting mechanism (not shown) is used to pivot the reception side polarizer 31 in the direction indicated by the broken line arrow in FIG. 2 to adjust the angle. In the embodiment of FIG. 2, an organic polarizer similar to that of the prior art is used as the emission side polarizer 34.

The structure of the reception side polarizer 31 will now be described with reference to FIG. 3.

The reception side polarizer 31 includes an inorganic polarization plate 31A, a holder 31B, a surface protection substrate 31C, and an organic polarization plate 31D that are coupled to one another as shown in the drawing. The inorganic polarization plate 31A is coupled to the holder 31B. The surface protection substrate 31C covers a surface of the inorganic polarization plate 31A on which a wire grid is formed. The organic polarization plate 31D is adhered to an outer surface of the surface protection substrate 31C.

The inorganic polarization plate 31A is a so-called inorganic wire grid polarization plate and includes a transparent glass substrate 31Aa and elongated metal (e.g., aluminum) elements 31Ab. The metal elements 31Ab are arranged on the glass substrate 31Aa generally parallel to one another at intervals shorter than the wavelength of light. The inorganic polarization plate 31A transmits polarized light that oscillates in a direction orthogonal to the longitudinal direction of the metal elements 31Ab and reflects polarized light that oscillates in a direction parallel to the longitudinal direction of the metal elements 31Ab. The wire grid type inorganic polarization plate 31A has light resistance that is higher than that of an absorptive type polarization plate.

The holder 31B includes a central open portion 31Bb, through which light passes, and a flat portion 31Ba, which encompasses the open portion 31Bb. The flat portion 31Ba has a thickness that is slightly greater than the projection height of the metal elements 31Ab from the glass substrate 31Aa of the inorganic polarization plate 31A. The holder 31B has a thickness around the periphery of the open portion 31Bb that is set so that the metal elements 31Ab and surface protection substrate 31C are as close as possible to one another but do not contact one another. Thus, the holder 31B also functions as a spacer that determines the distance between the glass substrate 31Aa and the surface protection substrate 31C. This eliminates the need for a dedicated spacer between the glass substrate 31Aa and the surface protection substrate 31C. The holder 31B may be formed from a heat resistant resin or metal. In the illustrated example, the holder 31B is a flat tetragonal frame including four sides. The flat portion 31Ba may be referred to as a flange.

The surface protection substrate 31C covers and protects the metal elements 31Ab on the inorganic polarization plate 31A. The surface protection substrate 31C is preferably formed from solely glass or a material of which the main component is glass. Such a material increases the light transmittance and heat resistance of the surface protection substrate 31C and the mechanical strength of the surface protection substrate 31C.

Like the emission side polarizer 34, the organic polarization plate 31D is similar to a conventional organic polarizer and used to supplement the polarizing capability of the wire grid type inorganic polarization plate 31A. The organic polarization plate 31D has a structure in which anisotropic light absorptive molecules, such as iodine or a dye, are oriented in a specific direction. The organic polarization plate 31D functions as a polarizer that absorbs the components of light oscillated in a specific direction.

Figure 3:
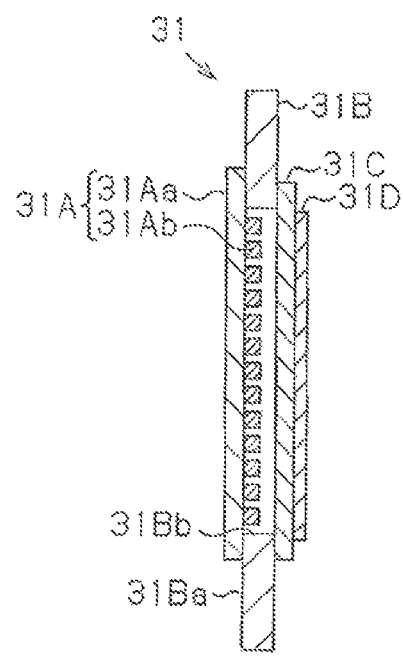
FIG. 3 is a cross-sectional view showing a wire grid type inorganic polarizer of a liquid crystal light valve according to one embodiment of the present invention.

FIG. 3 shows a structure for coupling the inorganic polarization plate 31A in the reception side polarizer 31. The inorganic polarization plate 31A is coupled to the holder 31B so that the flat portion 31Ba of the holder 31B is held between the glass substrate 31Aa and the surface protection substrate 31C with the wire grid, which is formed by the metal elements 31Ab on the inorganic polarization plate 31A, inserted into the open portion 31Bb. The organic polarization plate 31D is adhered to the light emission side, or outer surface, of the surface protection substrate 31C.

In this manner, the wire grid type inorganic polarization plate 31A, which has a relatively high light resistance, is arranged at the light reception side, and the organic polarization plate 31D, which has a relatively high polarizing capability, is arranged at the light emission side. This arrangement prevents light from lowering the polarizing capability of the organic polarization plate 31D. Further, a high polarizing capability for the organic polarization plate 31D is maintained over a long period of time. Accordingly, the reception side polarizer 31 is a hybrid polarizer that includes the wire grid type inorganic polarization plate 31A and the organic polarization plate 31D and has a high polarizing capacity and superior light resistance.

The method for coupling the glass substrate 31Aa and surface protection substrate 31C to the holder 31B of the inorganic polarization plate 31A is not particularly limited. The glass substrate 31Aa and surface protection substrate 31C may be fastened to the holder 31B directly by screws or indirectly by screws through a clamp (not shown). Further, the holder 31B may include an elastic engagement portion (not shown) such as a clip used to fasten the glass substrate 31Aa and the surface protection substrate 31C. Alternatively, the glass substrate 31Aa and the surface protection substrate 31C may be adhered to the holder 31B by an adhesive agent.

Figure 2:
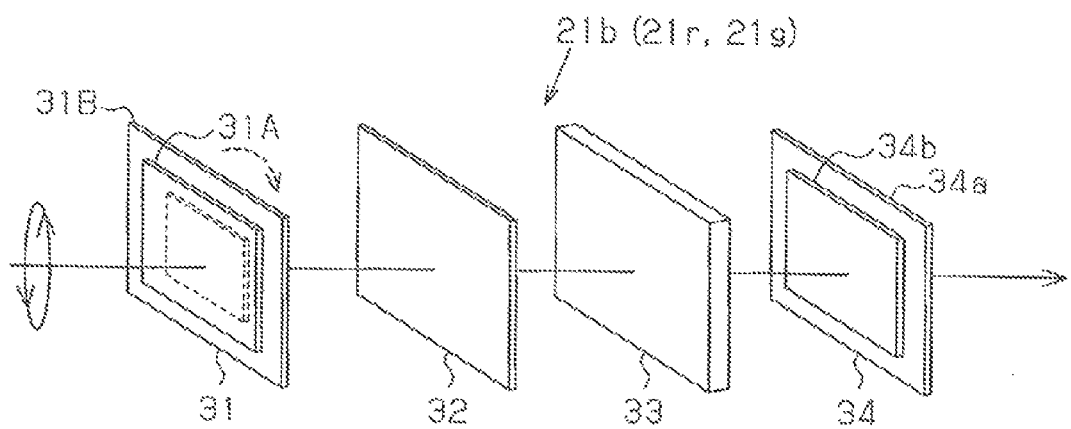
FIG. 2 is a perspective view showing the components of a liquid crystal light valve in the liquid crystal projector of FIG. 1.

The video projector of the present invention uses a wire grid type inorganic polarizer as one of the polarizers (i.e., the reception side polarizer 31 in the representative example shown in FIG. 2) in an optical modulation device. The other polarizer is a conventional absorptive type organic polarizer, which is formed from a polymer film containing iodine or a dye. The wire grid type inorganic polarization plate 31A requires high precision machining and is expensive. Thus, the wire grid type inorganic polarization plate 31A is used only where necessary to reduce costs. The wire grid type inorganic polarization plate 31A is used at a location that requires light resistance and heat resistance.

For example, in the liquid crystal light valve 21b for blue light, the use of the wire grid type inorganic polarization plate 31A in the reception side polarizer 31 is effective. Since blue light has a short wavelength and generates strong energy, the use of an organic polarization plate would burn the polarization film and adversely affect the polarizing function. Thus, an organic polarization plate would not be able to obtain the required light resistance. In this aspect, the application of the arrangement and structure shown in FIGS. 2 and 3 to the liquid crystal light valve 21b is effective. In FIGS. 2 and 3, the reception side polarizer 31 includes the organic polarization plate 31D at the light emission side of the polarizer 31 but also includes the inorganic polarization plate 31A at the light reception side. That is, the inorganic polarization plate 31A is located upstream of the organic polarization plate 31D in the light travelling direction. This reduces the energy of the light entering the organic polarization plate 31D.

Further, in the liquid crystal light valve 21g for green light, the emission side polarizer 34 requires heat resistance. More specifically, the intensity of green light is much greater than that of blue light and red light. Thus, when using a dye organic polarizer as the emission side polarizer 34 in the liquid crystal light valve 21g for green light, the absorbed heat may deform the polarizer or remove the dye from the polarizer thereby adversely affecting the polarizing function. Accordingly, in the liquid crystal light valve 21g for green light, it is preferable that the reception side polarizer 31 and emission side polarizer 34 of FIG. 2 be exchanged. More specifically, it is preferred that the organic polarizer shown as an emission side polarizer shown in FIG. 2 be used as the reception side polarizer 31, and the inorganic polarizer shown as an reception side polarizer in FIG. 2 be used as the emission side polarizer 34.

Further, in the liquid crystal light valve 21r for red light, the energy of light is less than the other colors. Further, the light intensity is not as high as green light. Thus, the necessity for using the wire grid type inorganic polarization plate 31A is low.

In this manner, the necessity for exchanging an organic polarizer with a wire grid type inorganic polarizer differs depending on the location of use. Thus, it is preferable that the balance between necessity and cost be considered to determine whether to use an organic polarizer or a wire grid type inorganic polarizer or whether to employ a hybrid type such as the reception side polarizer 31 of FIG. 2.

The liquid crystal light valves 21r, 21g, and 21b are examples of an optical modulation device. The reception side polarizer 31 is one example of a polarization device.

The above embodiment has the advantages described below.

(1) There is no need to couple a wire grid type inorganic polarization plate or surface protection substrate to a holder inside an opening. Further, the glass substrate 31Aa of the wire grid type inorganic polarization plate 31A and the surface protection substrate 31C are coupled to opposite sides of the flat portion 31Ba of the holder 31B, which includes the open portion 31Bb. This simplifies the coupling structure. Further, the holder 31B functions as a spacer. Thus, a dedicated spacer such as that of the prior art is not necessary. This reduces the number of components. Further, the glass substrate 31Aa of the wire grid type inorganic polarization plate 31A and the surface protection substrate 31C are adhered to the surfaces of the holder 31B. This prevents dust from entering the open portion 31Bb.

(2) The thickness of the holder 31B around the periphery of the open portion 31Bb is set so that the metal elements 31Ab are as close as possible to but not in contact with the surface protection substrate 31C. This allows the inorganic polarization plate 31A to be compact.

(3) The surface protection substrate 31C is formed from solely glass or from a material of which the main component is glass. This increases the light transmittance, heat resistance, and mechanical strength of the surface protection substrate 31C.

(4) The surface protection substrate 31C includes an outer surface to which the organic polarization plate 31D is adhered to supplement the polarizing function. The polarization plate 31D supplements the polarizing function of the wire grid type inorganic polarization plate 31A. This improves the polarizing function of the entire polarizer 31.

(5) The wire grid type inorganic polarization plate 31A is coupled to the light reception side of the holder 31B. The surface protection substrate 31C, which is formed from a transparent glass plate, is coupled to the light emission side of the holder 31B. The organic polarization plate 31D is coupled to the outer surface of the surface protection substrate 31C. The inorganic polarization plate 31A at the light reception side compensates for the insufficient light resistance of the organic polarization plate 31D. Accordingly, the polarizer 31 has a superior polarizing function and light resistant.

(6) The video projector of the present embodiment includes the liquid crystal light valves 21r, 21g, and 21b, each having a polarizer arranged at a light reception side and a light emission side of the liquid crystal panel 33. Some of the polarizers use the wire grid type inorganic polarization plate 31A, which is coupled by the coupling structure to the holder 31B. In this manner, the wire grid type inorganic polarization plate 31A is used in lieu of an organic polarization plate at where light resistance and heat resistance are required. This improves the light resistance and heat resistance of the polarizer. Further, this structure results in the video projector being applicable to higher contrast and higher luminance.

(7) The video projector of the present embodiment is a three-LCD projector that uses the liquid crystal light valves 21r, 21g, and 21b for red light, green light, and blue light. Any one of the liquid crystal light valves 21r, 21g, and 21b can use the wire grid type inorganic polarization plate 31A, which is coupled by the coupling structure to the holder 31B. In this manner, the wire grid type inorganic polarization plate 31A is used in lieu of an organic polarization plate at where light resistance and heat resistance are required. This improves the light resistance and heat resistance of the polarizer. Further, the wire grid type inorganic polarization plate 31A can be effectively used in accordance with the characteristics of the light for each color.

(8) The video projector of the present embodiment is a three-LCD projector that uses the liquid crystal light valves 21r, 21g, and 21b for red light, green light, and blue light. The reception side polarizer 31 in the liquid crystal light valve 21b for blue light uses the wire grid type inorganic polarization plate 31A, which includes the above-described coupling structure. Since blue light has a short wavelength and generates strong energy, the use of an organic polarization plate in the reception side polarizer 31 of the liquid crystal light valve 21b for blue light would burn the polarization film and adversely affect the polarizing function. Thus, an organic polarization plate would not be able to obtain the required light resistance. In this aspect, the use of the wire grid type inorganic polarization plate 31A at such a location would solve such a problem related to light resistance.

(9) The video projector of the present embodiment is a three-LCD projector that uses the liquid crystal light valves 21r, 21g, and 21b for red light, green light, and blue light. The light emission side polarizer 34 in the liquid crystal light valve 21g for green light uses the wire grid type inorganic polarization plate 31A, which includes the above-described coupling structure. The intensity of green light is much greater than that of blue light and red light. Thus, when using a dye organic polarizer as the emission side polarizer 34 in the liquid crystal light valve 21g for green light, an increase in the temperature may remove the dye from the polarizer thereby adversely affecting the polarizing function. Thus, an organic polarizer would not be able to obtain the required heat resistance. Accordingly, the use of the wire grid type inorganic polarization plate 31A at such a location would solve such a problem related to heat resistance. The video projector is suitable for use in a home theater, conference room, training room, classroom, recreation room, exhibition room, studio, and the like.

It should be apparent to those skilled in the art that the present invention may be embodied in many other specific forms without departing from the spirit or scope of the invention. Particularly, it should be understood that the present invention may be embodied in the following forms.

The organic polarization plate 31D may be eliminated.

In the prior art, an optical modulation device including a polarizer uses an optical compensator to widen the viewing angle and improve the image quality. The optical compensator 32 of the above embodiment is arranged separately from the reception side polarizer 31 and supported by a support base dedicated to the optical compensator 32. Instead, the optical compensator 32 may be adhered to the outer surface of the surface protection substrate 31C. In this case, the surface protection substrate 31C functions as a support base for the optical compensator 32, and the support base dedicated for an optical compensator may be eliminated. This reduces the number of components and obtains a compact liquid crystal light valve. The optical compensator 32 may be adhered to the outer surface of the organic polarization plate 31D. Alternatively, the organic polarization plate 31D may be eliminated for adhering the optical compensator 32 to the outer surface of the surface protection substrate 31C.

Figure 4:
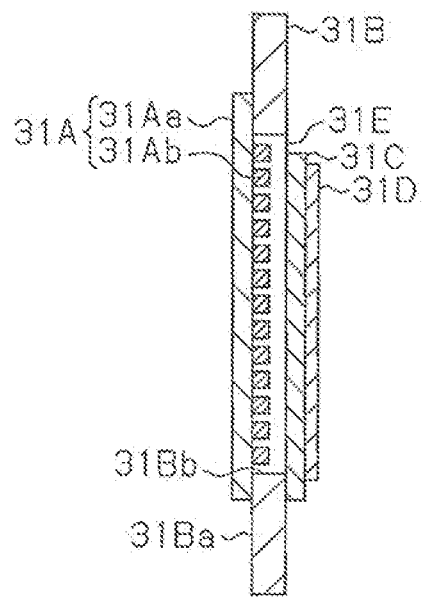
FIG. 4 is a cross-sectional view showing a modified example of a wire grid type inorganic polarizer.
Figure 5:
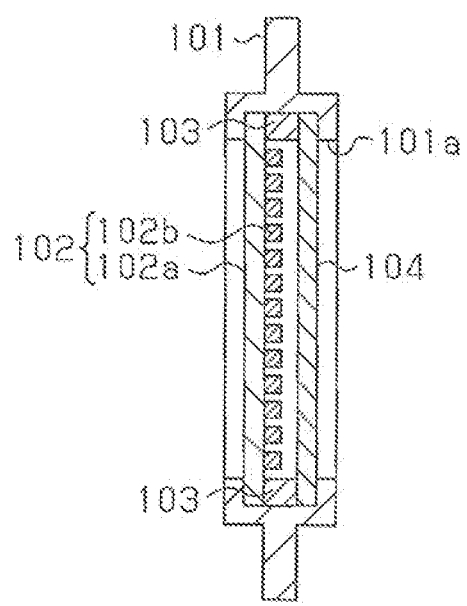
FIG. 5 is a cross-sectional view showing a conventional wire grid type inorganic polarizer.

In the example of FIG. 3, the surface protection substrate 31C is adhered to the holder 31B to completely seal the open portion 31Bb. As shown in FIG. 4, the surface protection substrate 31C may be coupled to the holder 31B to form an upper slit 31E that is in communication with the open portion 31Bb. Such a structure prevents dust from entering the open portion 31Bb while releasing heat, which is generated by the light irradiating the polarizer, from the slit 31E. This prevents heat from being trapped in the open portion 31Bb and lowers the temperature of the polarizer. For example, the surface protection substrate 31C may be coupled to the holder 31B without covering part of the open portion 31Bb. Alternatively, the surface protection substrate 31C may include a cutaway part or hole shaped in correspondence with the upper slit 31E.

The present examples and embodiments are to be considered as illustrative and not restrictive, and the invention is not to be limited to the details given herein, but may be modified within the scope and equivalence of the appended claims.

The invention claimed is:

1. A coupling structure for a wire grid type inorganic polarization plate, the coupling structure comprising:
   a holder including a flat portion and an open portion through which light passes;
   a wire grid type inorganic polarization plate including a glass substrate and a wire grid formed by a plurality of metal elements on the glass substrate; and
   a surface protection substrate that covers the wire grid;
   wherein the inorganic polarization plate is coupled to the holder with the flat portion of the holder held between the glass substrate and the surface protection substrate, and the wire grid inserted into the open portion of the holder, and
   a peripheral edge of the holder is protruded outside the inorganic polarization plate and the surface protection substrate to facilitate adjustment of a coupling angle of the inorganic polarization plate.

2. The coupling structure according to claim 1, wherein the holder has a thickness around the periphery of the open portion that is determined so that the metal elements are as close as possible to but not in contact with the surface protection substrate.

3. The coupling structure according to claim 1, wherein the surface protection substrate is formed from solely glass or a material of which the main component is glass.

4. The coupling structure according to claim 1, wherein the surface protection substrate includes an outer surface to which a polarization plate that supplements a polarization function is adhered.

5. The coupling structure according to claim 1, wherein
the inorganic polarization plate is coupled to a light reception side of the holder;
the surface protection substrate, which is formed from a transparent glass plate, is coupled to a light emission side of the holder; and
the surface protection substrate includes an outer surface to which an organic polarization plate is adhered.

6. The coupling structure according to claim 1, wherein the surface protection substrate includes an outer surface to which an optical compensator is adhered.

7. The coupling structure according to claim 1, wherein the surface protection substrate is coupled to the holder without covering part of the open portion of the holder to form a slit through which heat is released.

8. A video projector comprising a liquid crystal light valve, the liquid crystal light valve including:
a liquid crystal panel including a light reception side and a light emission side; and
polarizers arranged at the light reception side and light emission side of the liquid crystal panel;
wherein at least one of the polarizers includes:
a wire grid type inorganic polarization plate including a glass substrate, a wire grid formed by a plurality of metal elements on the glass substrate, and a surface protection substrate that covers the wire grid; and
a holder including a flat portion and an open portion through which light passes;
wherein the inorganic polarization plate is coupled to the holder with the that portion of the holder held between the glass substrate and the surface protection substrate, and the wire grid inserted into the open portion of the holder.

9. The video projector according to claim 8, wherein
the video projector is a three-LCD projector including a liquid crystal light valve for red light, a liquid crystal light valve for green light, and a liquid crystal light valve for blue light; and
the wire grid type inorganic polarization plate is used for one or more of the liquid crystal light valves.

10. The video projector according to claim 9, wherein the light reception side polarizer of the liquid crystal light valve far blue light includes the wire grid type inorganic polarization plate.

11. The video projector according to claim 9, wherein the light emission side polarizer of the liquid crystal light valve for green light includes the wire grid type inorganic polarization plate.

12. The video projector according to claim 9, wherein the light reception side polarizer of the liquid crystal light valve for blue light and the light emission side polarizer of the liquid crystal light valve for green light each include the wire grid type inorganic polarization plate.

13. A polarization device for an optical modulation device of a video projector, wherein the polarization device comprises:
a wire grid type inorganic polarization plate including a glass substrate and a wire grid formed by a plurality of metal elements on the glass substrate;
a surface protection substrate that covers the wire grid; and
a holder including a flat flange encompassing an open portion through which light passes;
wherein the inorganic polarization plate is coupled to the holder with the flat flange of the holder held between the glass substrate and the surface protection substrate, and the wire grid inserted into the open portion of the holder, and
a peripheral edge of the flat flange of the holder is protruded outside the inorganic polarization plate and the surface protection substrate to facilitate adjustment of a coupling angle of the inorganic polarization plate.

14. The polarization device according to claim 13, wherein
the glass substrate and the surface protection substrate each include a central portion, which corresponds to the wire grid, and an encompassment portion, which encompasses the central portion; and
the flat flange of the holder is held between the encompassment portion of the glass substrate and the encompassment portion of the surface protection substrate.

15. The polarization device according to claim 14, wherein
the flat flange includes a light reception surface and a light emission surface, and
the glass substrate and the surface protection substrate are respectively fixed to the light reception surface and the light emission surface.

16. The polarization device according to claim 14, wherein
the holder is a flat tetragonal frame including four sides, and
the glass substrate and the surface protection substrate are each fixed to the flat flange at locations corresponding to at least three of the four sides of the holder.

17. The polarization device according to claim 15, wherein the glass substrate and the surface protection substrate are each fixed to the flat flange at locations corresponding to the four sides of the holder.

18. The polarization device according to claim 15, further comprising an organic polarization plate supported via the holder, wherein the inorganic polarization plate is located upstream of the organic polarization plate in a light travelling direction.

* * * * *